United States Patent
Wallace et al.

(10) Patent No.: US 7,582,880 B2
(45) Date of Patent: Sep. 1, 2009

(54) NEUTRON DETECTOR USING LITHIATED GLASS-SCINTILLATING PARTICLE COMPOSITE

(75) Inventors: Steven Wallace, Knoxville, TN (US); Andrew C. Stephan, Knoxville, TX (US); Sheng Dai, Knoxville, TN (US); Hee-Jung Im, Knoxville, TN (US)

(73) Assignee: Neutron Sciences, Inc., Knoxville, TN (US)

( * ) Notice: Subject to any disclaimer, the term of this patent is extended or adjusted under 35 U.S.C. 154(b) by 1202 days.

(21) Appl. No.: 10/393,300

(22) Filed: Mar. 20, 2003

(65) Prior Publication Data
US 2003/0178574 A1 Sep. 25, 2003

Related U.S. Application Data

(60) Provisional application No. 60/366,030, filed on Mar. 20, 2002.

(51) Int. Cl.
*G01T 3/06* (2006.01)
(52) U.S. Cl. .................................. 250/390.11
(58) Field of Classification Search ............ 250/390.01, 250/390.12, 370.05, 484.5, 487.1, 484.2, 250/483.1, 486.1, 390.11, 390.1, 484.4; 252/301.4 R, 646
See application file for complete search history.

(56) References Cited

U.S. PATENT DOCUMENTS

| | | | |
|---|---|---|---|
| 2,799,780 A * | 7/1957 | Ruderman | 250/390.11 |
| 3,222,521 A | 12/1965 | Einfeld | |
| 3,988,586 A * | 10/1976 | Stuart et al. | 250/390.11 |
| 4,365,159 A | 12/1982 | Young | |
| 4,481,421 A | 11/1984 | Young et al. | |
| 4,641,028 A | 2/1987 | Taylor et al. | |
| 4,785,168 A * | 11/1988 | Ruscev et al. | 250/390.12 |
| 5,002,721 A | 3/1991 | Bernard et al. | |
| 5,216,249 A | 6/1993 | Jones et al. | |
| 5,289,510 A | 2/1994 | Mihalczo | |
| 5,313,504 A * | 5/1994 | Czirr | 376/153 |
| 5,334,840 A | 8/1994 | Newacheck et al. | |
| 5,336,889 A | 8/1994 | Hofstetter | |
| 5,345,084 A | 9/1994 | Byrd | |
| 5,532,482 A | 7/1996 | Stephenson | |
| 5,656,815 A | 8/1997 | Justus et al. | |

(Continued)

OTHER PUBLICATIONS

Im H.J., Willis C., Saengkerdsub S., Makote R., Pawel M. D., Dai S.; Scintillators for Alpha and Neutron Radiations Synthesized by Room Temperature Sol-Gel Processing; 2004; Journal of Sol-Gel Science and Technology; vol. 32; pp. 117-123.*

(Continued)

*Primary Examiner*—David P Porta
*Assistant Examiner*—David S Baker
(74) *Attorney, Agent, or Firm*—Pitts & Brittian, P.C.

(57) ABSTRACT

A neutron detector composed of a matrix of scintillating particles imbedded in a lithiated glass is disclosed. The neutron detector detects the neutrons by absorbing the neutron in the lithium-6 isotope which has been enriched from the natural isotopic ratio to a commercial ninety five percent. The utility of the detector is optimized by suitably selecting scintillating particle sizes in the range of the alpha and the triton. Nominal particle sizes are in the range of five to twenty five microns depending upon the specific scintillating particle selected.

13 Claims, 10 Drawing Sheets

U.S. PATENT DOCUMENTS

| | | | |
|---|---|---|---|
| 5,659,177 | A | 8/1997 | Schulte et al. |
| 5,680,423 | A * | 10/1997 | Perkins et al. .............. 376/153 |
| 5,726,453 | A | 3/1998 | Lott et al. |
| 5,880,471 | A | 3/1999 | Schelten et al. |
| 5,973,328 | A | 10/1999 | Hiller et al. |
| 6,134,289 | A | 10/2000 | Peurrung et al. |
| 6,471,888 | B1 * | 10/2002 | Mihalczo et al. ....... 252/301.17 |
| 6,668,033 | B1 * | 12/2003 | Schelten ..................... 376/159 |
| 6,876,711 | B2 * | 4/2005 | Wallace et al. .............. 376/154 |
| 2002/0067789 | A1 * | 6/2002 | Wallace et al. .............. 376/154 |
| 2002/0121604 | A1 * | 9/2002 | Katagiri ...................... 250/368 |
| 2005/0224720 | A1 * | 10/2005 | Dai et al. ............... 250/390.11 |

OTHER PUBLICATIONS

Kesanli B., Hong K., Meyer K., Im H.J., Dai S.; Highly Efficient Solid-State Neutron Scintillators Based on Hybrid Sol-Gel Nanocomposite Materials; 2006; Applied Physics Letters; vol. 89, pp. 214104-1 thru 214104-3.*

M. Ghioni et al., "Compact Active Quenching Circuit for Fast Photon Counting with Avalanche Photodiodes," Rev. Sci. Instr., (1996), pp. 3440-3448, 67.

M. Bliss et al., "Real-Time Dosimetry for Boron Neutron-Capture Therapy," IEEE Transactions on Nuclear Science, Aug. 1995, pp. 639-643, vol. 42, No. 4.

C. Mori et al., "Measurement of neutron and y-ray intensity distributions with an optical fiber-scintillator detector," Nuclear Instruments and Methods in Physics Research A 422, 1999, pp. 129-132.

A. Gorin et al., "Development of scintillation imaging device for cold neutrons," Nuclear Instruments and Methods in Physics Research A 479, 2000, pp. 456-460.

H. Krinninger et al., "Pulsed Neutron Method for Non-Destructive and Simultaneous Determination of the 235U and 239Pu Contents of Irradiated and Non-Irradiated Reactor Fuel Elements," Nuclear Instruments and Methods 73, 1969, pp. 13-33, North-Holland Publishing Co.

M. Zanarini et al., "Evaluation of Hydrogen content in Metallic Samples by Neutron Computed Tomography," IEEE Transactions on Nuclear Science, Aug. 1995, pp. 580-584, vol. 42, No. 4.

C. M. Logan et al., "Observed Penetration of 14-MeV Neutrons in Various Materials," Nuclear Science and Engineering: 115, 1993, pp. 38-42.

H. Jaeger et al., "Two-detector coincidence routing circuit for personal computer-based multichannel analyzer," Rev. Sci. Instrum. 66 (4), Apr. 1995, pp. 3069-3070, American Institute of Physics.

E. J. T. Burns et al., "A solenoidal and monocusp ion source (SAMIS)," Rev. Sci. Instrum. 67 (4), Apr. 1996, pp. 1657-1661, American Institute of Physics.

S. T. Coyle et al., "A low cost preamplifier for fast pulses from microchannel plates," Rev. Sci. Instrum. 66 (7), Jul. 1995, pp. 4000-4001, American Institute of Physics.

Y.G. Kudenko et al., "Extruded plastic counters with WLS fiber readout," Nuclear Instruments and Methods in Physics Research A 469, 2001, pp. 340-346.

S. Dai et al., "Spectroscopic Investigation of the Photochemistry of Uranyl-Doped Sol-Gel Glasses Immersed in Ethanol," Inorg. Chem., 1996, pp. 7786-7790, American Chemical Society.

* cited by examiner

NEUTRON DETECTOR USING LITHIATED GLASS-SCINTILLATING PARTICLE COMPOSITE

CROSS-REFERENCE TO RELATED APPLICATIONS

This application claims the benefit of U.S. Provisional Application No. 60/366,030, filed Mar. 20, 2002.

STATEMENT REGARDING FEDERALLY SPONSORED RESEARCH OR DEVELOPMENT

This invention was made with government support under contract DE-FG02-01ER83224 under the authority of Public Law 95-91, U.S. Department of Energy Organization Act: 106-554, Small Business Reauthorization Act of 2000 subject to legislation, regulations and policies applicable to Small Business Innovation Research (SBIR), and with government support under contract DE-AC05-00OR22725 between the U.S. Department of Energy and UT-Batelle, LLC. The Federal Government has a nonexclusive, nontransferable, irrevocable, paid-up license to practice or have practiced for or on behalf of the United States the subject invention throughout the world.

BACKGROUND OF THE INVENTION

1. Field of Invention

The field of invention is neutron detectors. More particularly, the present invention relates to a neutron detector having solid absorbers.

2. Description of the Related Art

Neutron detectors are useful in many industries. One industry, for example, in which neutron detectors are widely used is the oil industry, in which neutron detectors are used to detect potential oil yielding sites. Oil producing formations deep in the earth emit neutrons at a different rate than water bearing formations or non-fluid bearing rock. A device using neutron detection for logging oil wells is disclosed in U.S. Pat. No. 4,641,028 issued to Taylor et al., on Feb. 3, 1987.

The '028 patent teaches a well logging instrument for use in a cased well bore. The '028 device contains a sealed source of fast neutrons and two identical thermal neutron detectors with a volume of four atmospheres of helium-3 gas. The formation surrounding the cased well bore is bombarded with high energy neutrons and the two thermal neutron detectors are spaced apart from one another and from the source to receive slowed down or thermal neutrons from the surrounding formations. The epithermal or fast neutrons striking the formation are slowed down by fluids containing great quantities of hydrogen or chlorine atoms, creating thermal or slow neutrons, which the detectors respond to logarithmically and independently. The counting rate of each detector is processed independently to count rate meters and to a recorder to present two outputs of information. The presence or absence of hydrogen and chlorine atoms in the formations as detected by each detector.

In U.S. Pat. No. 5,532,482 issued to Stephenson on Jul. 2, 1996, teaches a method for determining a characteristic of an underground formation. The '482 method includes the steps of irradiating the formation with high-energy neutrons and detecting neutrons scattered by the formation. The detected neutrons have energies above epithermal to determine the nature of the formation matrix. Stephenson teaches that epithermal neutrons can also be detected to determine formation porosity. Stephenson utilizes an apparatus having a high-energy neutron source, typically a D-T accelerator producing 14 MeV neutrons, and detectors such as $^4$He-filled proportional counters for detecting neutrons having energies above epithermal and $^3$He-filled proportional counters for detecting epithermal neutrons.

In addition to the oil industry, neutron detectors are also commonly used in the medical industry. Neutron detectors are also useful for surveillance in nuclear facilities and weapons storage. While several specific utilities of neutron detectors are mentioned, it is well known to those skilled in the neutron detection art that neutron detectors are useful in many applications.

Neutrons are uncharged particles that can travel through matter without ionizing the matter. Because neutrons travel through matter in such a manner, neutrons are difficult to detect directly. Some other evidence of a neutron event must be detected in order to determine its existence. An indirect method detects the result of a neutron event and not the neutron event itself.

The use of indirect detection of neutrons is known in the art. For example, a neutron detector as disclosed in U.S. Pat. No. 5,334,840 issued to Newacheck et al., on Aug. 2, 1994, detects photons of light emitted by carbon infiltrated boron nitride in its hexagonal form when the compound is bombarded by neutrons. The amount of light detected correlates to the number of neutrons bombarding the boron nitride.

Another neutron detector commercially available utilizes helium-3 as the neutron absorber, such as in the '028 device described above. When bombarded by neutrons, helium-3 decomposes into H and $H_3$ having combined kinetic energies of 764 keV. The ionization of the gas electrons can be detected using conventional methods well known in the art and further described below. This type of neutron detector requires a long collection time for the resulting ionization requiring integrating and differentiating time constants of between 1 and 5 microseconds for the best results.

Other gas mixtures are commercially available that have varying resolution or charge per pulse yields depending on the gases used.

Neutron detection for monitoring the dose of thermal neutrons given to patients receiving boron neutron-capture therapy has used lithium-6 and a cerium activator in a glass fiber. See M. Bliss et al., "Real-Time Dosimetry for Boron Neutron-Capture Therapy", IEEE Trans. Nucl. Sci., Vol. 42, No. 4, 639-43 (1995). Hiller et al., in U.S. Pat. No. 5,973,328, issued on Oct. 26, 1999, improve this technique by allowing a cerium-activated glass fiber to be coated with fissionable elements. A wet chemistry method of placing radioactive fissile elements into glass—which in the vitrified state does not pose a hazard—as described in the '328 patent using sol-gel based technology, is a significant benefit. M. Ghioni et al., "Compact Active Quenching Circuit for Fast Photon Counting with Avalanche Photodiodes", Rev. Sci. Instr., 67, 3440-48 (1996), describe an avalanche photodiode implementation for detecting neutron induced ionization and optical pulse detection.

The '328 device introduced sol-gel techniques unique in the art of neutron detection. Sol-gel chemistry was first discovered in the late 1800s. This area of chemistry has received renewed interest when the process was found useful in producing monolithic inorganic gels at low temperatures that could be converted to glasses without a high temperature melting process. C. J. Brinker et al., "Sol-Gel Science: The Physics and Chemistry of Sol-Gel Processing" (Academic Press, Inc., New York 1990) provide a comprehensive explanation of sol-gel chemistry. Sheng Dai et al., "Spectroscopic Investigation of the Photochemistry of Uranyl-Doped Sol- Gel Glasses Immersed in Ethanol", Inorg. Chem., 35, 7786-90 (1996), provide further detail disclosing uranyl-doped sol-gel glasses.

Emissions detectors such as microchannel plates, channeltrons, and avalanche photodiodes are in common use for detecting ultraviolet (UV) light and fissioned charged particles such as electrons or protons. Microchannel plates are commercially available and well known in the art. Typically a microchannel plate is formed from lead glass having a uniform porous structure of millions of tiny holes or microchannels. Each microchannel functions as a channel electron multiplier, relatively independent of adjacent channels. A thin metal electrode is vacuum deposited on both the input and output surfaces to electrically connect channels in parallel. Microchannel plates can be assembled in stacked series to enhance gain and performance.

The microchannel plates serve to amplify emissions from fissionable material resulting from the bombardment of neutrons. The amplified signal is then detected and recorded. The signal frequency is proportional to the charged particle emissions, which are proportional to the amount of neutrons bombarding the fissionable material.

Channeltrons operate on the same basic principal of amplifying proportional signals emitted from fissionable materials. A channeltron is a horn-shaped continuous dynode structure that is coated on the inside with an electron emissive material. An ion striking the channeltron creates secondary electrons that have an avalanche effect to create more secondary electrons and finally a current pulse.

Typically due to the exotic materials and sensitivity of the equipment, the neutron detectors currently available are expensive and difficult to maintain. For example helium-3 is an extremely rare stable isotope and must be separated at considerable expense from the radioactive gas tritium. Furthermore, the use of a gas absorber results in a slower response time than a solid absorber as disclosed herein. The '328 device thus incorporated fissionable material into a sol-gel composition in combination with an emission detector.

Neutron scattering is a powerful tool for conducting scientific studies of the physical geometry of molecules important in biology and material science. Protein structure and the structure of superconductors are of immediate practical importance. The detection of the scattered neutrons is an area where advancements are necessary. Specifically of concern are the ability to locate the scattered neutrons and the ability to rapidly process the neutron signals as the detection rate becomes very rapid.

Currently, a major research facility using spallation is being constructed by the Department of Energy. Spallation is a nuclear reaction in which incident particles bombard an atomic nucleus to eject particles from the nucleus. The Spallation Neutron Source (SNS) facility under construction in Oak Ridge, Tenn., is designed to have an output of pulsed neutrons that is the most intense in the world of its type. The SNS is provided with multiple experimental stations using pulsed neutrons. One such experimental station locates the neutrons diffracted from a target on an x-y plane. The time of the neutron absorption on the x-y plane surface is then referenced to a fiducial timing signal to an accuracy of within 100 nanoseconds of the absorption event.

Mori et al., "Measurement of Neutron and γ-ray Intensity Distributions with an Optical Fiber-Scintillator Detector," Nuclear Instruments and Methods in Physics Research, A 422, 129-132 (1999), describe a ZnS(Ag) scintillator with lithium-6 on the tip of an optical fiber for locating neutrons with a position resolution of 1 mm in a 10 minute interrogation and within a volume wherein the tip is extendable one meter. Gorin et al., "Development of Scintillation Imaging Device for Cold Neutrons," Nuclear Instruments and Methods in Physics Research, A 479, 456-460 (2002), have described using ZnS(Ag) and lithium-6 fluoride coupled to wavelength-shifting fibers. Gorin et al., employ arrays of fibers in two planes rotated ninety degrees relative to each other such that an absorbed neutron is located in the plane to a resolution of 1 mm.

Wallace et al., Nuclear Instruments and Methods A 483 (2002) 764-773 report the gamma insensitivity of the thin film lithiated glass. This specificity of the lithiated glass for generating a signal in the presence of gamma radiation has application to the monitoring of spent nuclear fuel rods and for the determination of the fissile mass within remote handle transuranic waste.

Other methods and devices have been developed for neutron detection. Typical of the art are those methods and devices disclosed in the following U.S. Patents:

| Pat. No. | Inventor(s) | Issue Date |
|---|---|---|
| 3,222,521 | K. Einfeld | Dec. 7, 1965 |
| 4,365,159 | C. A. Young | Dec. 21, 1982 |
| 4,481,421 | C. A. Young et al. | Nov. 6, 1984 |
| 5,002,721 | P. Bernard et al. | Mar. 26, 1991 |
| 5,216,249 | B. L. Jones et al. | Jun. 1, 1993 |
| 5,289,510 | J. T. Mihalczo | Feb. 22, 1994 |
| 5,336,889 | K. J. Hofstetter | Aug. 9, 1994 |
| 5,345,084 | R. C. Byrd | Sept. 6, 1994 |
| 5,656,815 | B. L. Justus et al. | Aug. 12, 1997 |
| 5,659,177 | R. L. Schulte et al. | Aug. 19, 1997 |
| 5,726,453 | R. G. Lott et al. | Mar. 10, 1998 |
| 5,880,471 | J. Schelton et al. | Mar. 9, 1999 |
| 6,134,289 | A. J. Peurrung et al. | Oct. 17, 2000 |

Of these patents, Einfeld ('521) teaches a method and apparatus for the non-destructive testing of a substance to determine the concentration of two or more fissionable isotopes in the substance. Einfeld teaches generation of first and second neutron spectrums, each having a unique mean energy. Determination of the number of fissions as a function of the neutron spectrum applied follows from the counting of the prompt and/or delayed neutrons produced by the fissions.

Young ('159) teaches a neutron detection apparatus including a selected number of flat surfaces of lithium-6 foil. A gas mixture is in contact with each of the flat surfaces for selectively reacting to charged particles emitted by or radiated from the lithium foil. A container is provided to seal the lithium foil and the gas mixture in a volume from which water vapor and atmospheric gases are excluded, the container having one or more walls capable of transmitting neutrons. Monitoring equipment in contact with the gas mixture detects reactions taking place in the gas mixture, and, in response to such reactions, provides notice of the flux of neutrons passing through the volume of the detector.

Similarly, Young et al., ('421) teach a neutron detection apparatus is provided including a selected number of surfaces of lithium-6 coated wire mesh in contact with a gas mixture for selectively reacting to charged particles emitted or radiated by the lithium-6 coated mesh. As in the '159 device, a container is provided to seal the lithium-6 coated mesh and the gas mixture in a volume from which water vapor and atmospheric gases are excluded, the container having one or more walls capable of transmitting to neutrons. Monitoring equipment in contact with the gas mixture detects the generation of charged particles in the gas mixture and, in response to such charged particles, provides an indication of the flux of neutrons passing through the volume of the detector.

Bernard et al., ('721) disclose a first and second assemblies. The first assembly includes a neutron radiation source, a hydrogenated material block having a recess for receiving the neutron radiation source, and a first neutron detector. The second assembly includes a hydrogenated material block surrounded by a material stopping the thermal neutrons and a second neutron detector placed in the hydrogenated material block. The first and second assemblies are placed on either side of the area to be controlled.

Jones et al., ('249) disclose a neutron detector formed from a layer of polycrystalline diamond deposited by a chemical vapor deposition process. The diamond material contains $^{10}B$ as a dopant, in a concentration of 1,000 ppm or less. In one embodiment, the layer of diamond material is deposited on a supporting substrate, which may comprise a layer of diamond material. In another embodiment, the substrate comprises a layer of conductive or semi-conductive material. The diamond material is deposited on top of the substrate, with at least two regions in contact with the semi-conductive material. A central portion of the semi-conductive material is etched away, and electrical contacts are applied to the remaining portions of the semi-conductive substrate. A stated advantage of the '249 neutron detector is that the diamond layer is very thin, less than 50 µm thick, so that the sensitivity of the detector to other radiation, particularly γ radiation, is reduced.

In the '510 patent, Mihalzco teaches nuclear reaction detectors capable of position sensitivity with sub-millimeter resolution in two dimensions. The nuclear reaction detectors include two arrays of scintillation or wavelength shifting optical fibers. Each array is formed of a plurality of optical fibers disposed in a side-by-side relationship. The two arrays are disposed in X- and Y-directions with respect to each other, with a layer of nuclear reactive material disposed between and operatively associated with surface regions of the optical fiber arrays. Each nuclear reaction occurring in the layer of nuclear reactive material produces energetic particles for simultaneously providing a light pulse in a single optical fiber in the X-oriented array and in a single optical fiber in the Y-oriented array. These pulses of light are transmitted to a signal producing circuit for providing signals indicative of the X-Y coordinates of each nuclear event.

The nuclear reactive material of the '510 patent is doped with a phosphor such as calcium tungstate, magnesium tungstate, zinc silicate, zinc sulfide, cadmium tungstate, and cadmium borate. Mihalzco further teaches that a compound such as $^6LiF$ or glass or plastic scintillators containing $^{235}U$, $^{10}B$, or $^{238}U$ provides a concentration of the phosphor dopant in the layer of nuclear reactive material sufficient to assure that an adequate distribution of phosphor to be contacted by and react with the energetic particle produced from each nuclear reaction. Normally, a concentration of the phosphor dopant in the range of about 100 ppm to about 2 percent by volume is adequate for the purposes of the Mihalzco detectors.

Hofstetter ('889) discloses a gamma radiation detector using a radioluminescent composition. The detector includes a radioluminescent composition that emits light in a characteristic wavelength region when exposed to γ radiation. The composition contains a scintillant such as anglesite ($PbSO_4$) or cerussite ($PbCO_3$) incorporated into an inert, porous glass matrix via a sol-gel process. Particles of radiation-sensitive scintillant are added to a sol solution. The mixture is polymerized to form a gel, then dried under conditions that preserve the structural integrity and radiation sensitivity of the scintillant. The final product is a composition containing the uniformly-dispersed scintillant in an inert, optically transparent and highly porous matrix. Hofstetter describes the resulting composition as chemically inert and substantially impervious to environmental conditions.

In the Byrd ('084) device, a plurality of omnidirectional radiation detectors is arranged in a close packed symmetrical pattern to form a segmented detector. The output radiation counts from these detectors are arithmetically combined to provide the direction of a source of incident radiation. Output counts from paired detectors are subtracted to yield a vector direction toward the radiation source. The counts from all of the detectors are combined to yield an output signal functionally related to the radiation source strength.

Justus et al., ('815) teach an apparatus and method for detecting radiation using a light transparent thermoluminescent dosimeter. The dosimeter includes a nanocrystalline phosphor dispersed in a light transparent glassy matrix. The dosimeter is placed in an environment in which radiation is present for a period of time, removed from the environment and then heated to emit light. The intensity of the light emission is indicative of the radiation dose. The method is used to detect and record the dosage of both UV and ionizing radiation. In one embodiment of the '815 device in which the dosimeter is in the form of a flat plate, ambient α or β radiation populates traps. The flat dosimeter is then heated and the emitted light is guided to the edges of the dosimeter by total internal reflection, where it is detected and recorded.

R. L. Schulte et al., ('177) teach a directional thermal neutron detector for detecting thermal neutrons and determining the direction of the thermal neutron source. The directional detector includes an array of individual thermal neutron detector modules, each of which comprises front and back planar silicon detectors between which is disposed a gadolinium foil. The array comprises a plurality of individual detector modules angularly displaced with respect to each other. The direction of the thermal neutron source is determined by comparing the magnitudes of the output signals from the plurality of angularly displaced detector modules. Each thermal neutron detector module is segmented into four quadrants to reduce its capacitance and resultant noise. The thickness of the gadolinium foil in each thermal neutron detector module is at least 15 microns thick, to improve the front-to-back silicon detector counting ratio to ascertain the side (front or back) from which thermal neutrons are arriving at the detector. The thick gadolinium foil makes each detector module substantially opaque to thermal neutrons, and the detector modules are positioned relative to each other in the array to shield one another from thermal neutrons, thereby enhancing the angular resolution of the directional thermal neutron detector. Gamma rays are discriminated against by using coincidence signal processing within the elements of the detector sandwich to reduce the gamma ray contribution to the total signal.

Lott et al., ('453) disclose a radiation resistant solid state neutron detector. The '453 detector uses a neutron converter material such as boron or lithium to react with neutrons to create charged particles that are received in a semiconductor active region of the detector. The active thickness of the detector is smaller than the range of the charged particles. Since most of the radiation damage produced by impinging charged particles occurs near the end of the range of the particles, displacement damage predominantly occurs outside of the active region. Although the charged particles pass through the semiconductor material, the particles cause electron excitation within the semiconductor material, the electron excitation being detected in the form of an electronic pulse. The '453 detector is provided to increase resistance to radiation damage, improve high temperature operation, and to obtain real time measurements of neutron flux in reactor cavities and other previously inaccessible locations.

Schelton et al., ('471) disclose a neutron detector for the detection of thermal neutrons. The '471 neutron detector includes $^6$LiF layers for the conversion of the neutrons to ionizing radiation. The $^6$LiF layers are surrounded by layers for detecting the ionizing radiation generated by the neutrons in the $^6$LiF layers.

Peurrung et al., ('289) teach a system for measuring a thermal neutron emission from a neutron source. The '289 device includes a reflector/moderator proximate the neutron source that reflects and moderates neutrons from the neutron source. The reflector/moderator further directs thermal neutrons toward an unmoderated thermal neutron detector.

Other references of interest in the art of neutron detection include:

- H. Krinninger et al., "Pulsed Neutron Method for Non-Destructive and Simultaneous Determination of the $^{235}$U and $^{239}$Pu Contents of Irradiated and Non-Irradiated Reactor Fuel Elements," Nucl. Instr. Meth. 73, 13-33 (1969);
- M. Zanarini et al., "Evaluation of Hydrogen Content in Metallic Samples by Neutron Computed Tomography," IEEE Trans. Nucl. Sci., 42, 580-84 (1995);
- C. M. Logan et al., "Observed Penetration of 14-MeV Neutrons in Various Materials," Nucl. Sci. Eng. 115, 38-42 (1993);
- H. Jaeger et al., "Two-Detector Coincidence Routing Circuit for Personal Computer-Based Multichannel Analyzer," Rev. Sci. Instrum. 66, 3069-70 (1995);
- E. J. T. Burns et al., "A Solenoidal and Monocusp Ion Source (SAMIS)," Rev. Sci. Instr., 67, 1657-60 (1996);
- S. T. Coyle et al., "A Low Cost Preamplifier for Fast Pulses From Microchannel Plates," Rev. Sci. Instr., 66 4000-01 (1995); and
- Y. G. Kudenko et al., "Extruded Plastic Counters with WLS Fiber Readout," Nucl. Inst. And Meth. A 469, 340-346 (2001).

BRIEF SUMMARY OF THE INVENTION

The present invention is a neutron detector composed of a matrix of scintillating particles imbedded in a lithiated glass is disclosed. The lithiated glass is formed through one of several methods including, but not limited to: mixing scintillating particles into a high temperature liquid; mixing powdered lithium glass and scintillating particulates and melting the mixture to fuse the particulates in the glass; and polymerizing a mixture of scintillating particulates in a sol-gel lithiated glass precursor. The neutron detector is provided for detecting neutrons by absorbing the neutrons in a lithium-6 isotope enriched from its natural isotopic ratio to approximately ninety-five percent (95%). The utility of the detector is optimized by suitably selecting scintillating particle sizes in the range of the alpha and the triton. Nominal particle sizes are in the range of five to twenty-five (5-25) microns, depending upon the specific scintillating particle selected.

The neutron absorber/scintillating particle matrix utilizes scintillating particles having a scintillating pulse width output less than 100 nanoseconds. Coupling of the lithium-6 to the scintillating particulates is accomplished as a homogeneous distribution of the lithium-6 within a glass produced using sol-gel chemistry and into which scintillating particulates are embedded. The lithiated glass is useful for generating a signal in the presence of gamma radiation. The material is useful in manufacturing a neutron detector so that a large area is observable for detecting neutrons at a relatively high resolution.

The neutron detecting material is fabricated from a scintillating material and a matrix material. The matrix material is provided to fill spaces between particles of the scintillating material. The matrix material is a glass having a volumetrically high loading of a neutron absorbing material.

As a neutron is absorbed in the matrix material, ions having a high kinetic energy are created. The ions then transverse from the matrix material into the scintillating material, creating an ionized path. As a result of the ionization path within the scintillating material, a scintillation output is generated. Upon relaxation of the ions into a non-ionized state, photons are yielded. The photons are of a wavelength and duration characteristic of the scintillator material.

A layer of material defines first and second opposing surfaces. A light reflecting layer is coated on the first surface of the material. The light reflecting layer is provided for reflecting photons back into the material to be transmitted through the second surface to then be detected. A detector is provided for detecting the photons. The detector is disposed proximate the material layer second surface. A scintillating layer is selectively positioned between the material layer and the detector.

In an alternate employment of the material of the present invention, the second surface of a layer of the neutron detecting material is disposed on a quartz disk to form a rigid surface. Optics composed of at least one lens are placed between the material and the detector. The optics also include at least one turning mirror as required. The optics are optimized to focus an image on the receptor surface of the detector. In this configuration, an incident beam of neutrons is passed through a sample and toward the material. Scintillation pulses from an incident beam of neutrons passing through a sample are directed through the optics toward the detector.

In a further embodiment utilizing a layer of the neutron detecting material, a reflective layer such as chrome is disposed on the first surface of the material layer. A scintillating layer such as yttrium aluminum garnet is disposed on the second surface of the material layer. A detector is disposed proximate the scintillating layer as described in either of the prior embodiments, or other conventional detector arrangements.

In one such conventional detector arrangement, two planar arrays of fibers are provided. The two fiber arrays are disposed orthogonally with respect to each other, with a first array disposed in a local x-direction, and a second array disposed in a local y-direction. A plurality of PMTs is associated with each array of fibers for receiving optical pulses from the individual fibers. A neutron detecting material layer is disposed between the proximal ends of each layer of fibers. Scintillation activity generated by the detection of neutrons in the material is detected by a fiber in each array. The location of the scintillation activity is determined to be the coordinates of the fiber in the first array and the fiber of the second array.

Various materials have been used to fabricate the neutron detecting material of the present invention. Scintillation materials used for testing include: polystyrene doped with PPO (2,5-diphenyloxazole) as a primary flour and POPOP (1,4-bis(5-phenyloxazol-2-yl) benzene) as a secondary flour; $Lu_2SiO_5$:Ce; $Y_2SiO_5$:Ce; ZnO:Ga; $Y_3Al_5O_{12}$:Ce; $CaSiO_3$:Mn,Pb; $La_2O_2S$:Eu; BC-400 and CaS:Ce. Various neutron absorbing materials have also been tested. The neutron absorbing material is lithiated glass manufactured using the sol-gel process.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
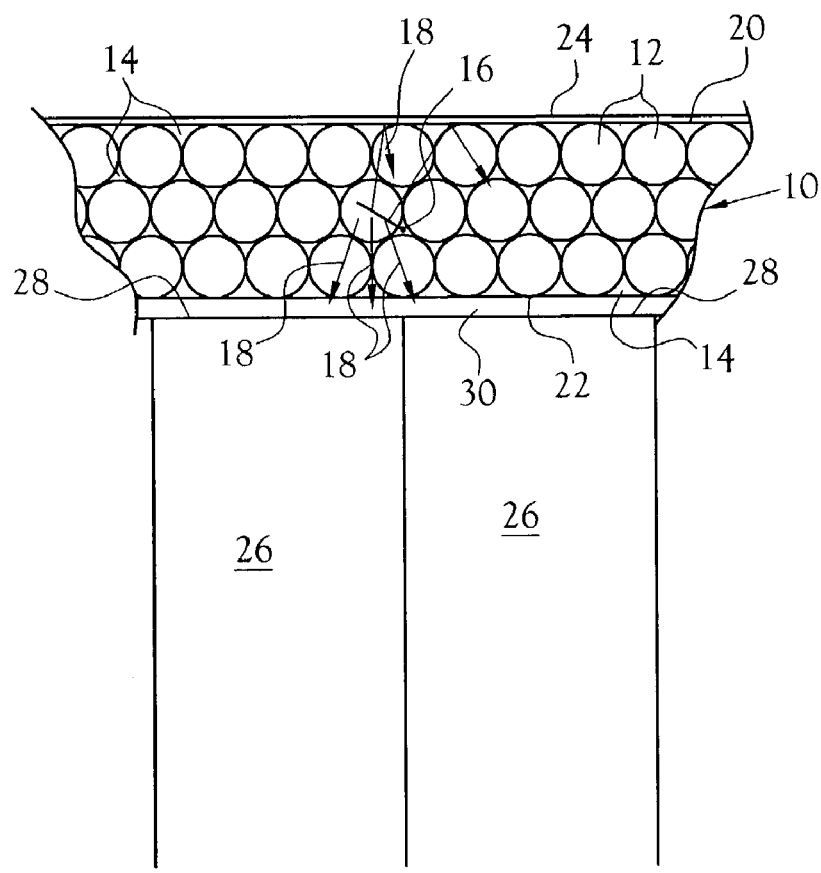
FIG. 1 is an elevation view of the neutron detecting material of the present invention showing the neutron detecting composite structure and one preferred means of coupling to light detecting and processing elements.

A neutron detector composed of a matrix of scintillating particles imbedded in a lithiated glass is disclosed. The lithiated glass with embedded scintillating particles is formed through one of several methods. These methods include mixing scintillating particles into a high temperature lithiated glass liquid; mixing powdered lithium glass and scintillating particulates and melting the mixture to fuse the particulates in the glass; and polymerizing a mixture of scintillating particulates in a sol-gel lithiated glass precursor. The neutron detector of the present invention is provided for detecting neutrons by absorbing the neutrons in a lithium-6 isotope enriched from its natural isotopic ratio to approximately ninety-five percent (95%). The utility of the detector is optimized by suitably selecting scintillating particle sizes in the range of the alpha and the triton. Nominal particle sizes are in the range of five to twenty-five (5-25) microns, depending upon the specific scintillating particle selected. The range of scintillating particles amenable to detection using the present invention is limited only by compatibility with current sol-gel methodology and compatibility with high temperature fusion into the lithiated glass.

The present invention provides a means for manufacturing a neutron absorber/scintillating particle matrix utilizing scintillating particles having emission properties superior to ZnS (Ag). Specifically, the scintillating pulse width output is less than 100 nanoseconds. Coupling of the lithium-6 to the scintillating particulates is accomplished as a homogeneous distribution of the lithium-6 within a glass produced using sol-gel chemistry and into which scintillating particulates are embedded, as opposed to the use of lithium fluoride particulates. The lithiated glass of the present invention is useful for generating a signal in the presence of gamma radiation. Specific applications of the material of the present invention include, but are not limited to, monitoring spent nuclear fuel rods and determining fissile mass within remote handle transuranic waste. The material of the present invention is also useful in manufacturing a neutron detector so that a large area is observable for detecting neutrons at a relatively high resolution. For instance, in one application, a resolution of approximately 1 mm is accomplished. The material of the present invention is capable of being replicated in order to provide a relatively large area (square meters) sensitive to neutrons.

The present invention is an extension of the technology disclosed in the above-referenced '328 patent issued to Hiller et al., and incorporated herein by reference, with which there is at least one common inventor to the present invention. As a point of reference for description of the present invention, the '328 patent teaches a neutron detector composed of fissionable material contained within a glass film and combined with a particle detector. The fissionable material incorporates ions of an element selected from the group consisting of lithium, uranium, thorium, plutonium, and neptunium. The neutron detector of the '328 patent is fabricated using a sol-gel method. When the glass film is bombarded with neutrons, the fissionable material emits fission particles and electrons. Hiller et al., further disclose the prompt emission of activated elements yielding a high-energy electron contained within a sol-gel glass film in combination with a particle detector. The emissions resulting from neutron bombardment are then detected using standard UV and particle detection methods well known in the art, such as with microchannel plates, channeltrons, and silicon avalanche photodiodes.

The neutron detecting material of the present invention is illustrated schematically at 10 in the Figures. Referring to FIG. 1, the neutron detecting material, or material 10, is fabricated from a scintillating material 12 and a matrix material 14. The matrix material 14 is provided to fill spaces between particles of the scintillating material 12. The matrix material 14 of the preferred embodiment is a glass having a volumetrically high loading of a neutron absorbing material. In the present practical demonstration of the invention the preferred neutron absorbing element is lithium-6. The scintillating material 12 is in the present case demonstrated using yttrium silicate and yttrium aluminum garnet.

As a neutron 16 is absorbed in the matrix material 14, ions having a high kinetic energy are created. The ions then transverse from the matrix material 14 into the scintillating material 12, creating an ionized path 18. As a result of the ionization path 18 within the scintillating material 12, a scintillation output is generated. Upon relaxation of the ions into a non-ionized state, photons are yielded. The photons are of a wavelength and duration characteristic of the scintillator material 12.

Also illustrated in FIG. 1 is one preferred employment of the material 10 of the present invention. In this embodiment, a layer of material 10 defines first and second opposing surfaces 20,22. A light reflecting layer 24 is coated on the first surface 20 of the material 10. The light reflecting layer 24 of one embodiment is fabricated from chrome. The light reflecting layer 24 is provided for reflecting photons back into the material 10 to be transmitted through the second surface 22 to then be detected. A detector 26 such as the illustrated photomultiplier tube (PMT) is provided for detecting the photons. The detector 26 is alternatively selected from a microchannel plate, a channeltron, and a avalanche photodiode. The detector 26 is disposed proximate the material layer second surface 22. In an alternate embodiment (not shown), no light reflecting layer 24 is provided. In this alternate embodiment, the detector 26 is placed proximate either of the first and second surfaces 20,22 of the material 10 layer.

A scintillating layer 30 is positioned between the material 10 layer and the detector 26. In one embodiment, the scintillating layer 30 is fabricated from quartz. In an alternate embodiment, the scintillating layer 30 is fabricated from yttrium aluminum garnet. In a further embodiment, the face of an amorphous silicon detector similar to those used for imaging x-rays in mammography is used as the detector 26 and the scintillating layer 30 is omitted.

Figure 2:
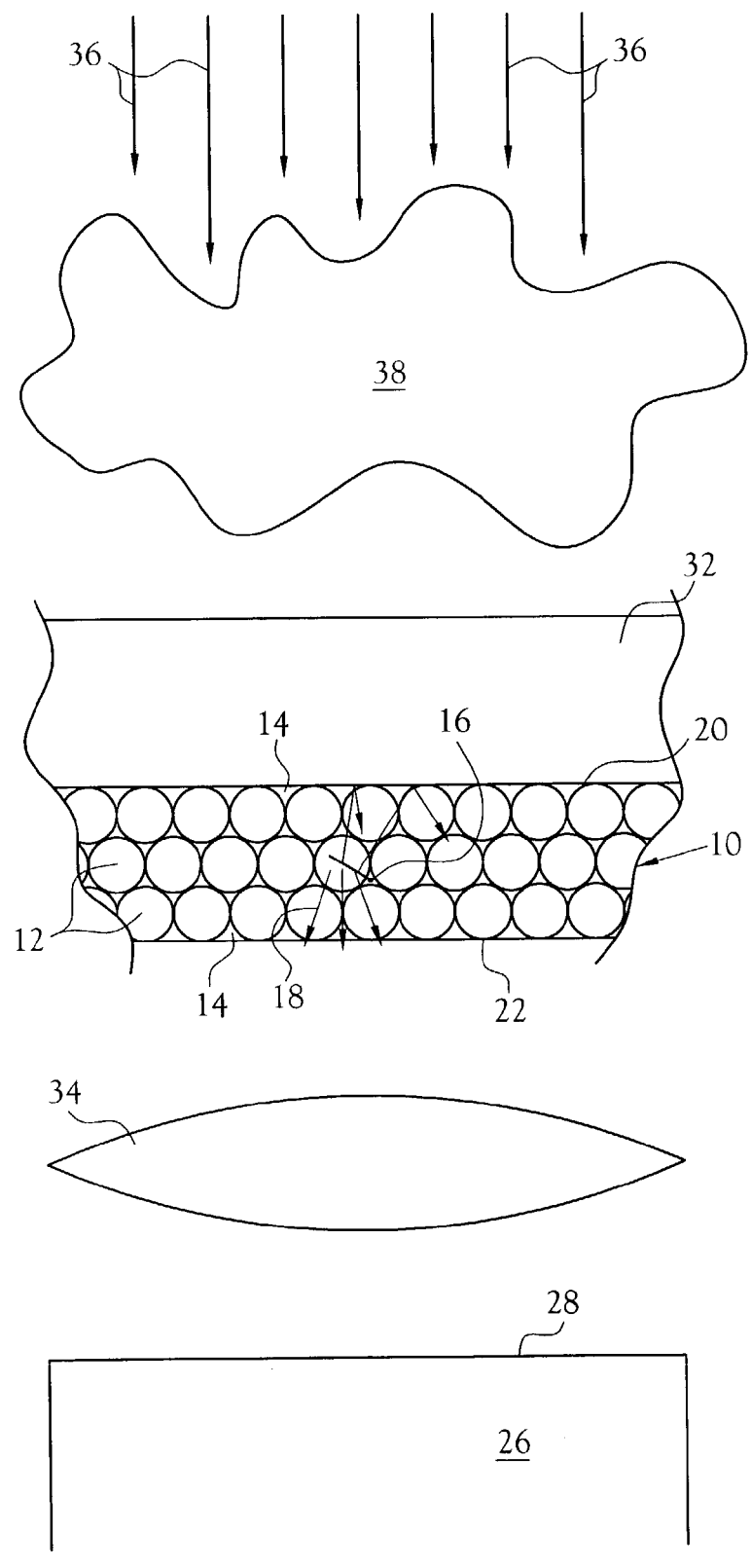
FIG. 2 is an elevation view of the neutron detecting material of the present invention showing the neutron detecting composite structure and an alternate means of coupling to light detecting and processing elements.

FIG. 2 illustrates an alternate employment of the material 10 of the present invention. In this embodiment, the second surface 22 of a layer of the neutron detecting material 10 is disposed on a quartz disk 32 to form a rigid surface. Optics 34 composed of at least one lens are placed between the material 10 and the detector 26. The optics 34 also include at least one turning mirror as required. The optics 34 are optimized to focus an image on the receptor surface 28 of the detector 26. In this embodiment, the detector 26 is a charge coupled device (CCD), which is an electronic digital camera element of up to several megapixels.

In the embodiment of FIG. 2, an incident beam 36 of neutrons is passed through a sample 38 and toward the material 10. Scintillation pulses from an incident beam 36 of neutrons passing through a sample 38 are directed through the optics 34 toward the detector 26.

Figure 3:
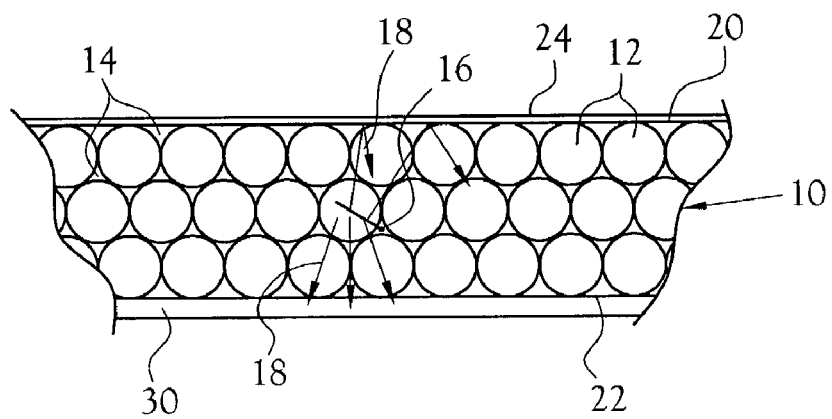
FIG. 3 is an alternate neutron detecting composite structure incorporating the neutron detecting material of the present invention.

FIG. 3 illustrates a further embodiment utilizing a layer of the neutron detecting material 10 of the present invention. In this embodiment, a reflective layer 24 such as chrome is disposed on the first surface 20 of the material 10 layer. A scintillating layer 30 such as yttrium aluminum garnet is disposed on the second surface 22 of the material 10 layer. A detector 26 is disposed proximate the scintillating layer 30 as described in either of the embodiments illustrated in FIGS. 1 and 2, or other conventional detector arrangements.

Figure 4:
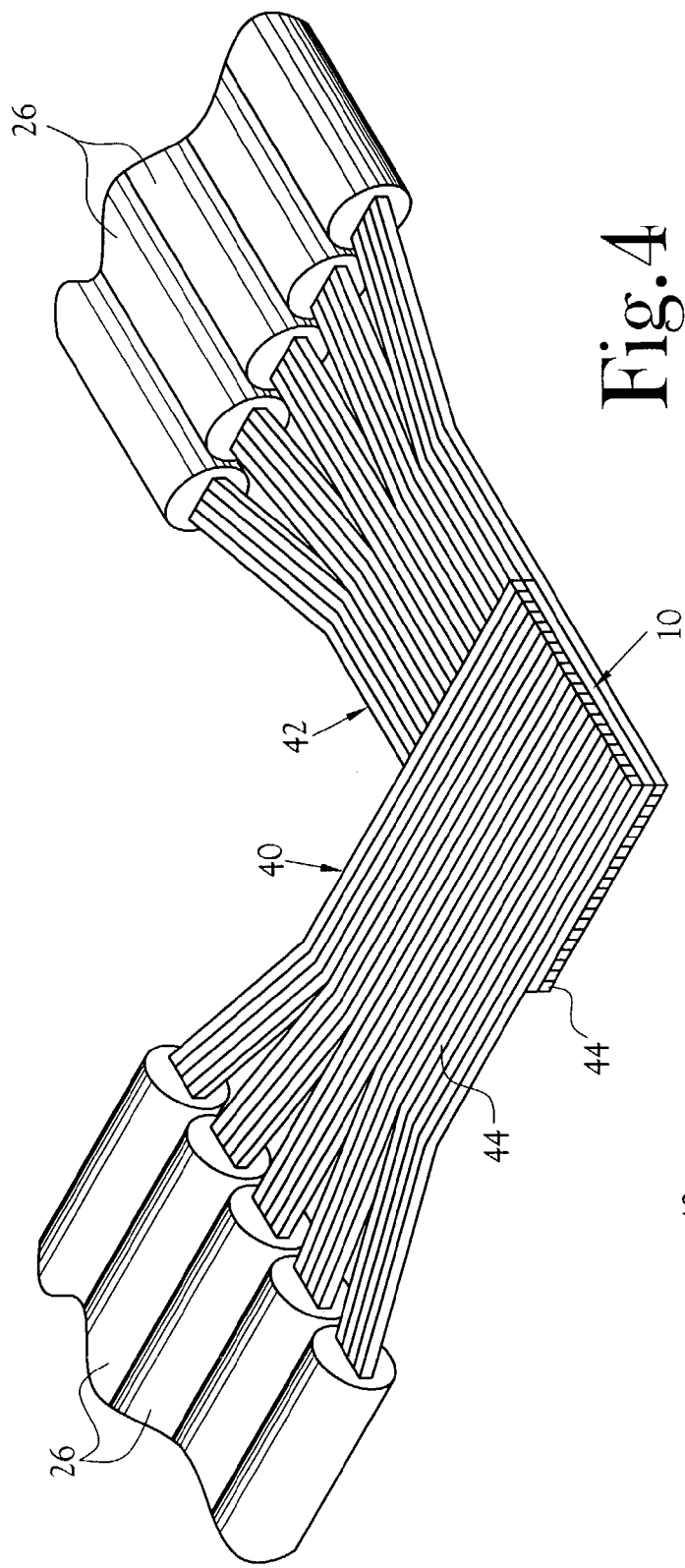
FIG. 4 is a perspective view of the neutron detecting material of the present invention showing the neutron detecting composite structure and an alternate means of coupling to light detecting and processing elements.
Figure 5:
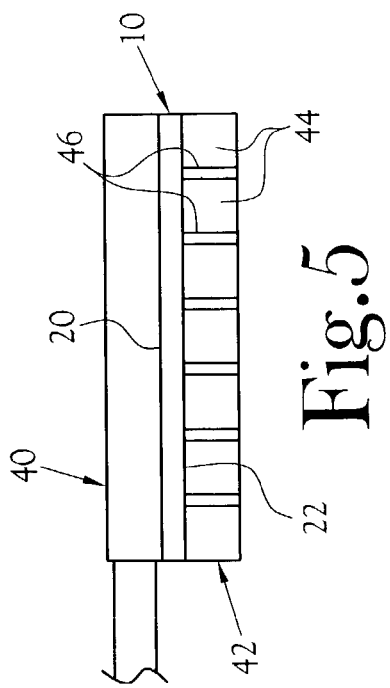
FIG. 5 is an elevation view of the neutron detecting composite structure and means for coupling to light detecting and processing elements of FIG. 4, better illustrating reflectors for preventing optical cross-talk.

As discussed in the background art above, one such conventional detector arrangement is described by Gorin et al., "Development of Scintillation Imaging Device for Cold Neutrons," Nuclear Instruments and Methods in Physics Research, A 479, 456-460 (2002). Illustrated in FIGS. 4 and 5 is a similar construction using the neutron detecting material 10 of the present invention. As illustrated, two planar arrays 40,42 of fibers 44 are provided. The two fiber arrays 40,42 are disposed orthogonally with respect to each other, with a first array 40 disposed in a local x-direction, and a second array 42 disposed in a local γ-direction.

FIG. 4 better illustrates a plurality of PMTs 26 associated with each array 40,42 of fibers 44 for receiving optical pulses from the individual fibers 44. The PMTs 26 are disposed at the distal end of each array of fibers 40,42. A neutron detecting material 10 layer is disposed between the proximal ends of each layer 40,42 of fibers 44. Scintillation activity generated by the detection of neutrons in the material 10 is detected by a fiber 44 in each array 40,42. The location of the scintillation activity is determined to be the coordinates of the fiber 44 in the first array 40 and the fiber 44 of the second array 42.

FIG. 5 illustrates a side view of the first array 40 of fibers 44, as well as an end view of the second array 42 of fibers 44. Each array 40,42 of fibers 44 is similarly constructed. As illustrated, a reflector 46 is disposed between successive pairs of fibers 44 in the fiber array 40,42 in order to prevent optical cross-talk between the individual fibers 44.

Although not illustrated, the neutron detecting material 10 of the present invention is also useful in a detector arrangement similar to that disclosed by Byrd in the aforementioned U.S. Pat. No. 5,345,084. In such an arrangement, an array of neutron detectors of the present invention are used for providing the direction of a neutron source. The array is augmented with boron loaded polyethylene collimation to enhance discrimination with respect to determining the direction of the source of neutrons. Such arrangement is useful, for example, for locating a mass of plutonium within a drum, and for measuring the curium concentration along the length of a spent nuclear fuel rod.

In either of the above-described embodiments utilizing the material 10 of the present invention, processing signals from the various described detectors is well known in the art of imaging and detecting light.

Various materials have been used to fabricate the neutron detecting material 10 of the present invention. Several scintillation materials have been tested in lithiated sol-gel for light pulse output in a gamma free port at the Intense Pulsed Neutron Source located at the Argonne National Laboratory. Scintillation materials used for testing include: polystyrene doped with PPO (2,5-diphenyloxazole) as a primary flour and POPOP (1,4-bis(5-phenyloxazol-2-yl) benzene) as a secondary flour; $Lu_2SiO_5$:Ce; $Y_2SiO_5$:Ce; ZnO:Ga; $Y_3Al_5O_{12}$:Ce; $CaSiO_3$:Mn,Pb; $La_2O_2S$:Eu; BC-400 and CaS:Ce. Each scintillation material was individually mixed with a lithiated sol-gel, the sol-gel then being placed upon a 3.8 cm quartz disk of a nominal one (1) mm thickness. The disk was coupled to a PMT using a commercial optical couplant available from St. Gorbain. $Y_2O_3$:Eu was evaluated using a Cf-252 source. The neutron detecting material 10 of the present invention was disposed on a quartz disk which was coupled to the face of a Hamamatsu R580 PMT. Neutrons scattered out of the beam line into the neutron detecting material 10 generated scintillation pulses upon absorption by the lithium-6 and the ionization in the scintillation particulates from the stopping of the triton and alpha particle. A LeCroy LT344 500 MHz digitizing oscilloscope recorded the scintillation pulse from the photomultiplier. Each scintillation material had a ten percent to ninety percent (10%-90%) of peak rise time of less than sixteen nanoseconds and a full-width-half-maximum duration of less than seventy nanoseconds. The scintillation pulse width of the selected materials was based upon literature and vendor reported measurements. Other materials are commercially available having similar fluorescent output pulse widths.

Figure 6:
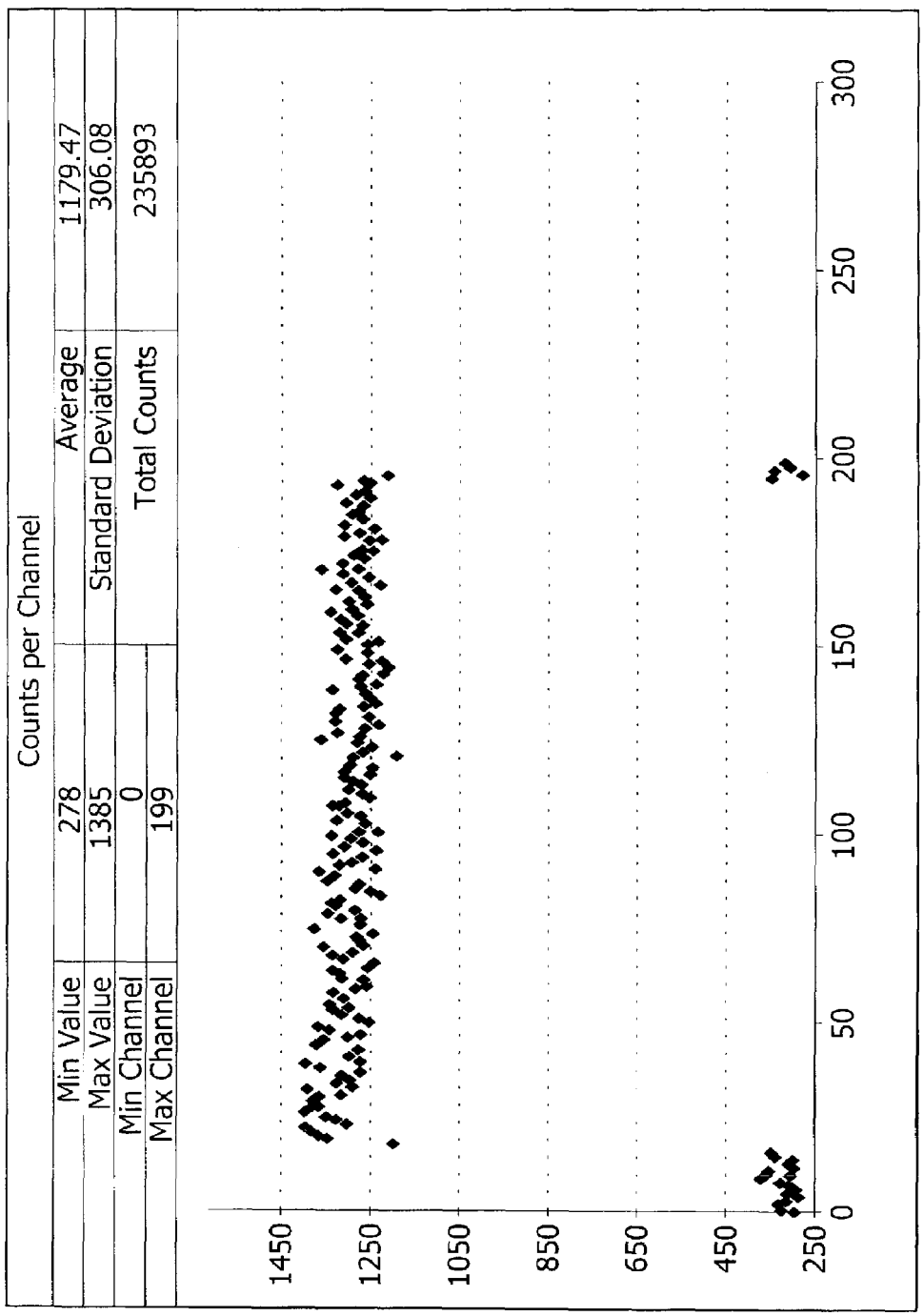
FIG. 6 graphically illustrates tests results of a one cm cube (1 cm$^3$) of lutetium orthosilicate covered with a coating of lithium-6 doped sol-gel glass.
Figure 7:
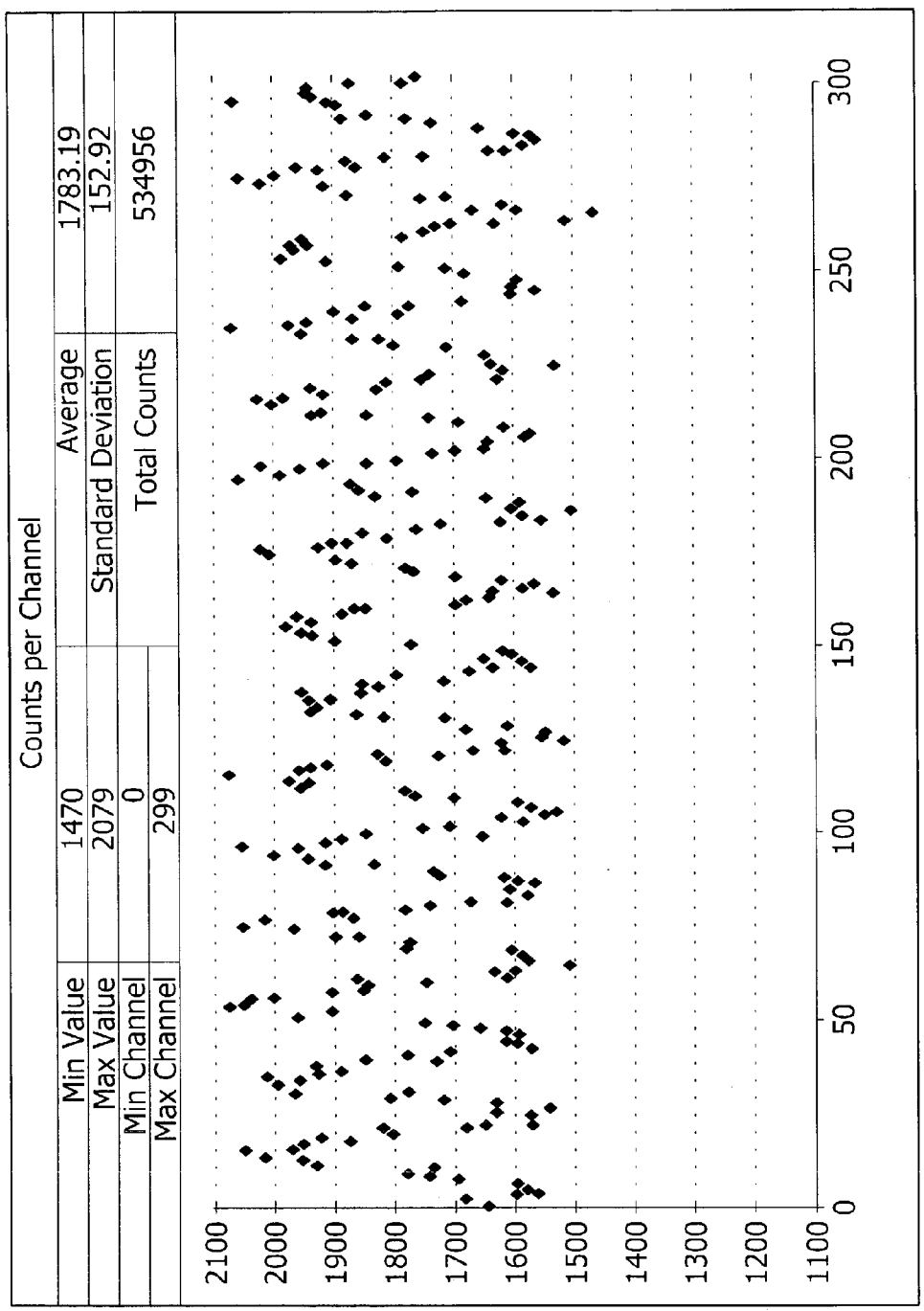
FIG. 7 graphically illustrates test results the neutron detecting assembly of the present invention taped to an anterior wall within a rotating assay chamber.

FIGS. 6 and 7 graphically illustrate the results of such testing. FIG. 6 illustrates the results for a one cm cube (1 $cm^3$) of lutetium orthosilicate covered with a coating of lithium-6 doped sol-gel glass. The cube was coupled to a Hamamatsu R1306-01 PMT having 800 volt applied across the multiplication stages. The assembly incorporating the neutron detecting material 10 was placed within a chamber of polyethylene designed for the irradiation of 55 gallon drums containing fissile waste. A deuterium-tritium tube in the wall of the chamber was pulsed for three minutes. Concurrently, scintillation pulses were noted using an Ortec pci-based multichannel scaler that accumulated the pulses occurring in one-second intervals. As illustrated, the cube of lutetium orthosilicate has a natural background count of a nominal 300 pulses per second for the geometry used. When neutrons are generated by the D-T generator and pass into the chamber, the detector captures approximately 1000 neutrons per second from the neutrons filling the chamber from the irradiating source.

FIG. 7 illustrates the response of the neutron detecting assembly taped to an interior wall within an assay chamber identical to that used for taking the data of FIG. 6. In FIG. 7, the source is a threaded rod inserted through a center hole in the lid of a 55 gallon drum (not illustrated). In this case the drum is rotated at a rate of three revolutions per minute (3 RPM). The modulation of the neutron signal as the drum rotates is clearly seen. In this case the mean capture of neutrons is about 1500 neutron scintillation pulses each second. FIG. 7 demonstrates that an array of detectors is useful for locating a source of neutrons within a container by rotating the object within a fixed field of the detector assemblies of the present invention.

Figure 8:
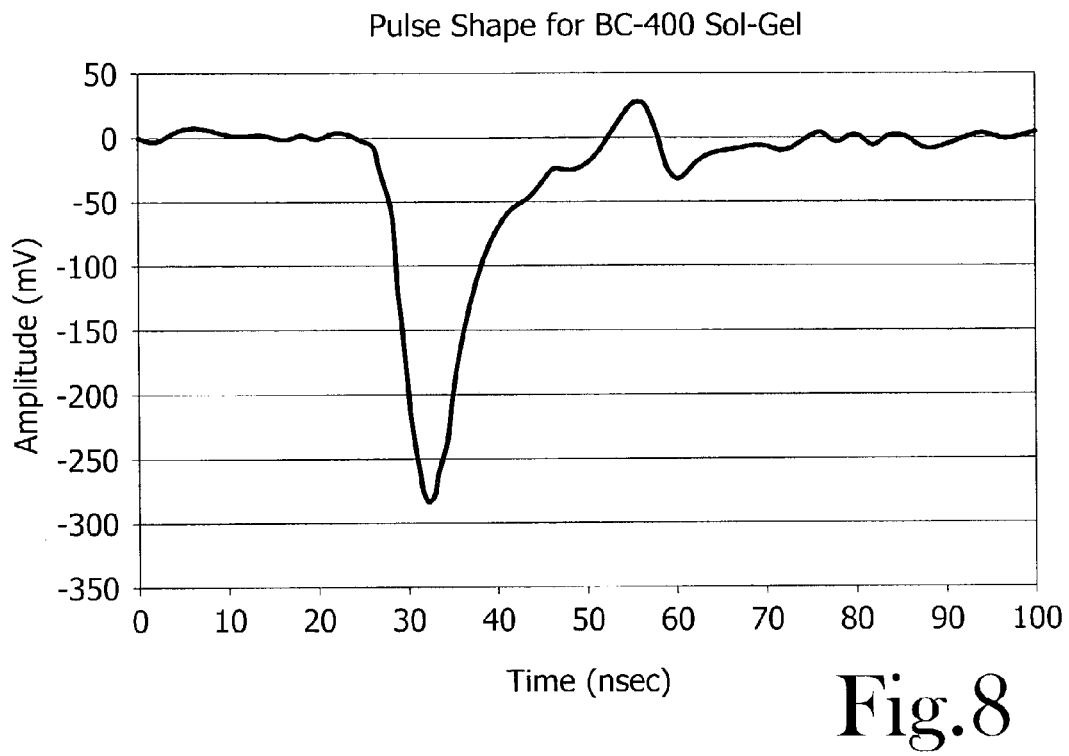
FIG. 8 illustrates the pulse shape for BC-400 sol-gel glass.
Figure 9:
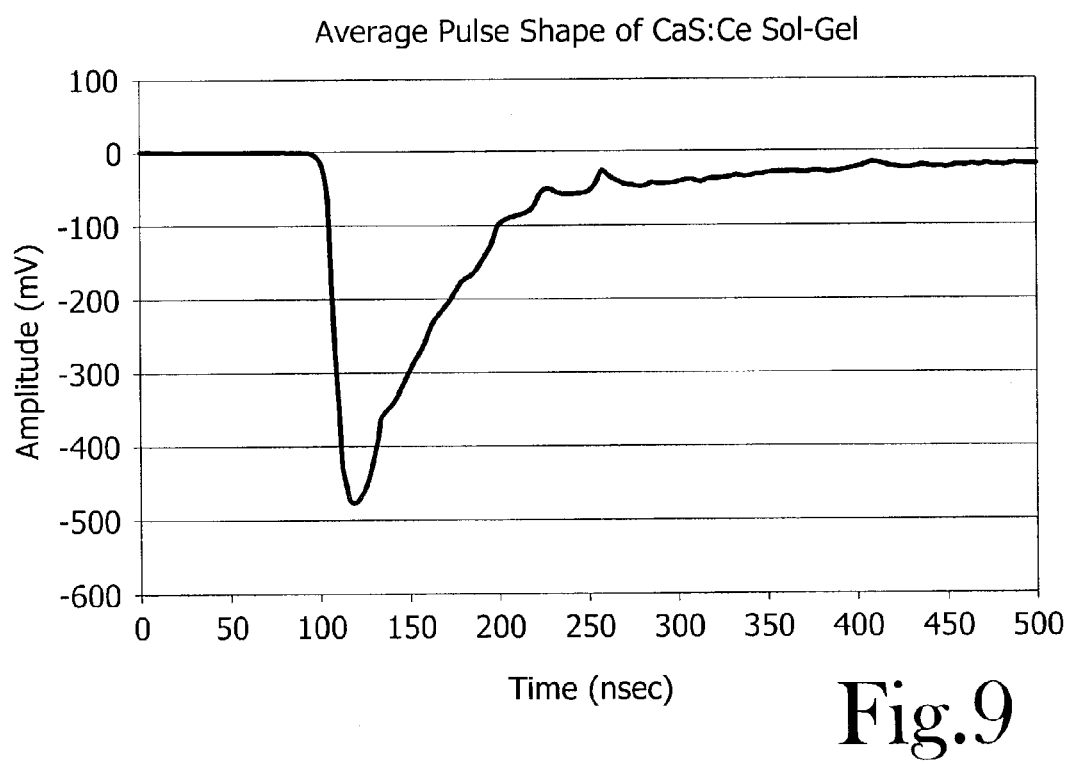
FIG. 9 illustrates the pulse shape for CaS:Ce sol-gel glass.
Figure 10:
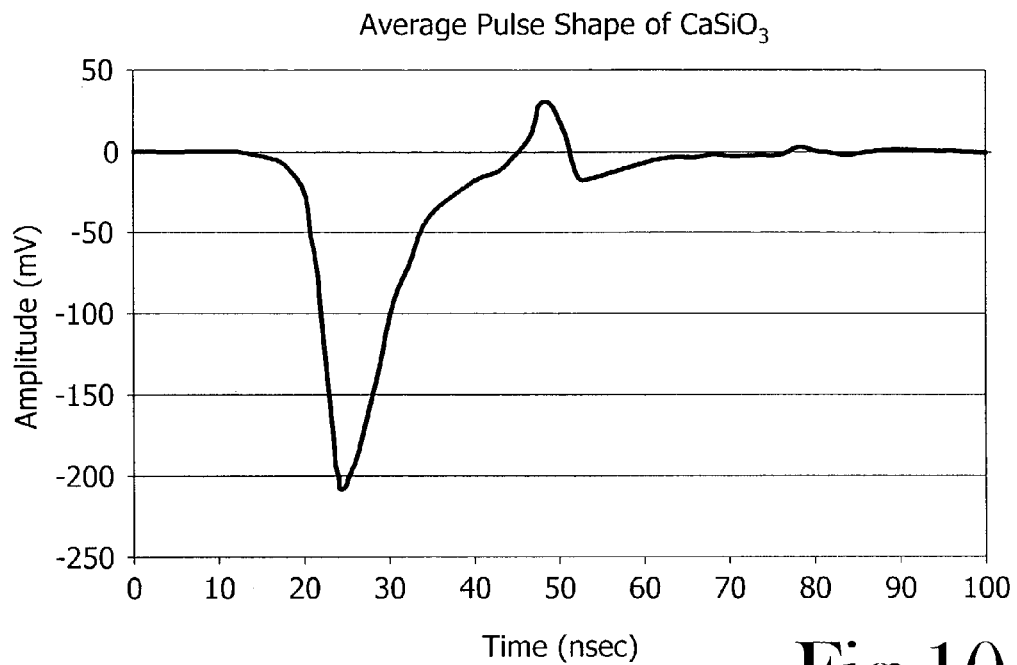
FIG. 10 illustrates the pulse shape for CaSiO3:Mn,Pb sol-gel glass.
Figure 11:
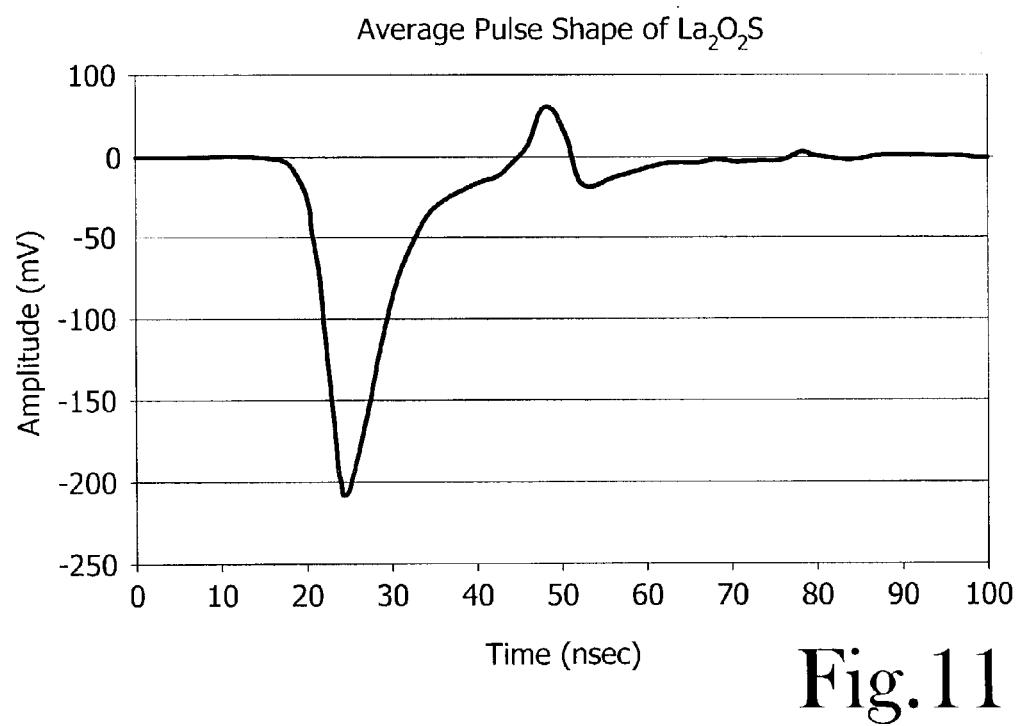
FIG. 11 illustrates the pulse shape for La$_2$O$_2$S:Eu sol-gel glass.
Figure 12:
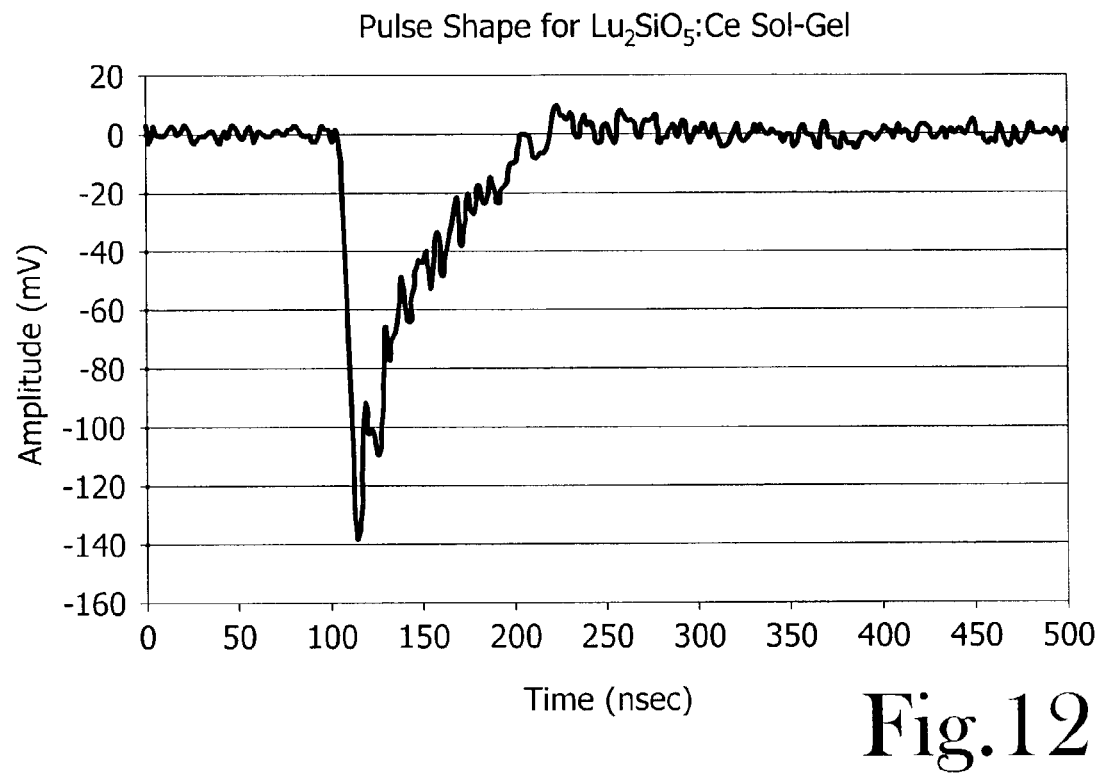
FIG. 12 illustrates the pulse shape for Lu$_2$SiO$_5$:Ce (furnished by CTMI, Knoxville, Tenn.) sol-gel glass.
Figure 13:
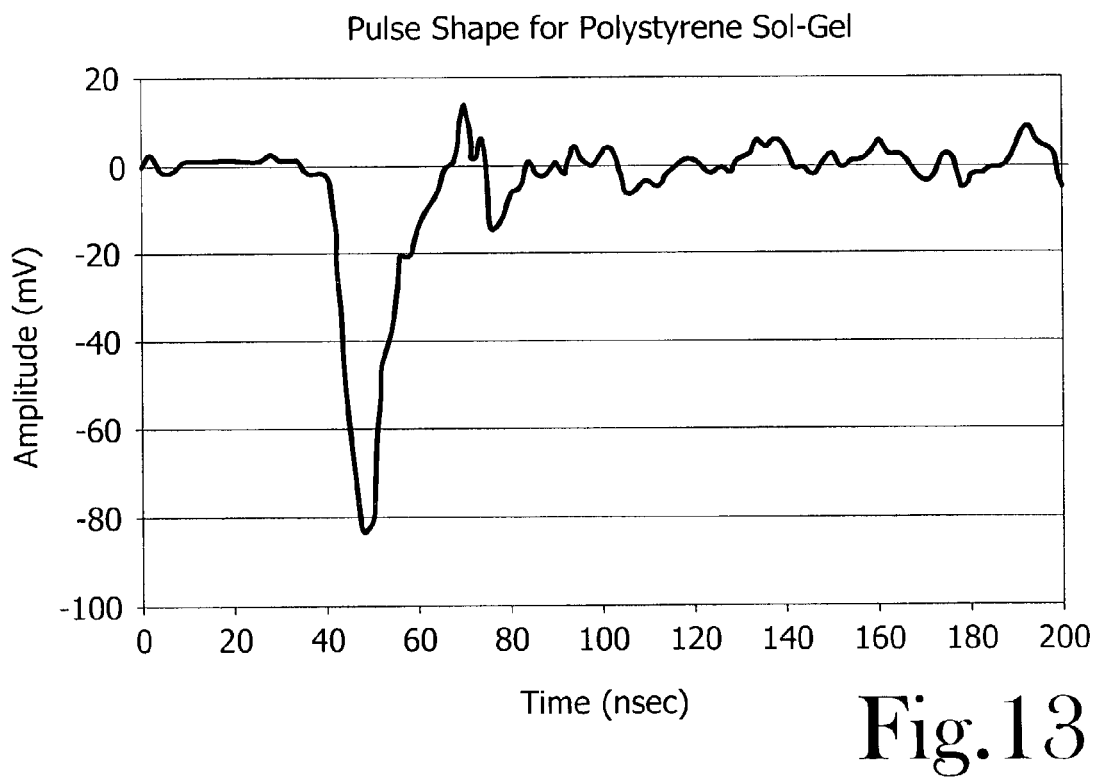
FIG. 13 illustrates the pulse shape for polystyrene-POPOP-PPO (furnished by Fermi National Laboratory) sol-gel glass.
Figure 14:
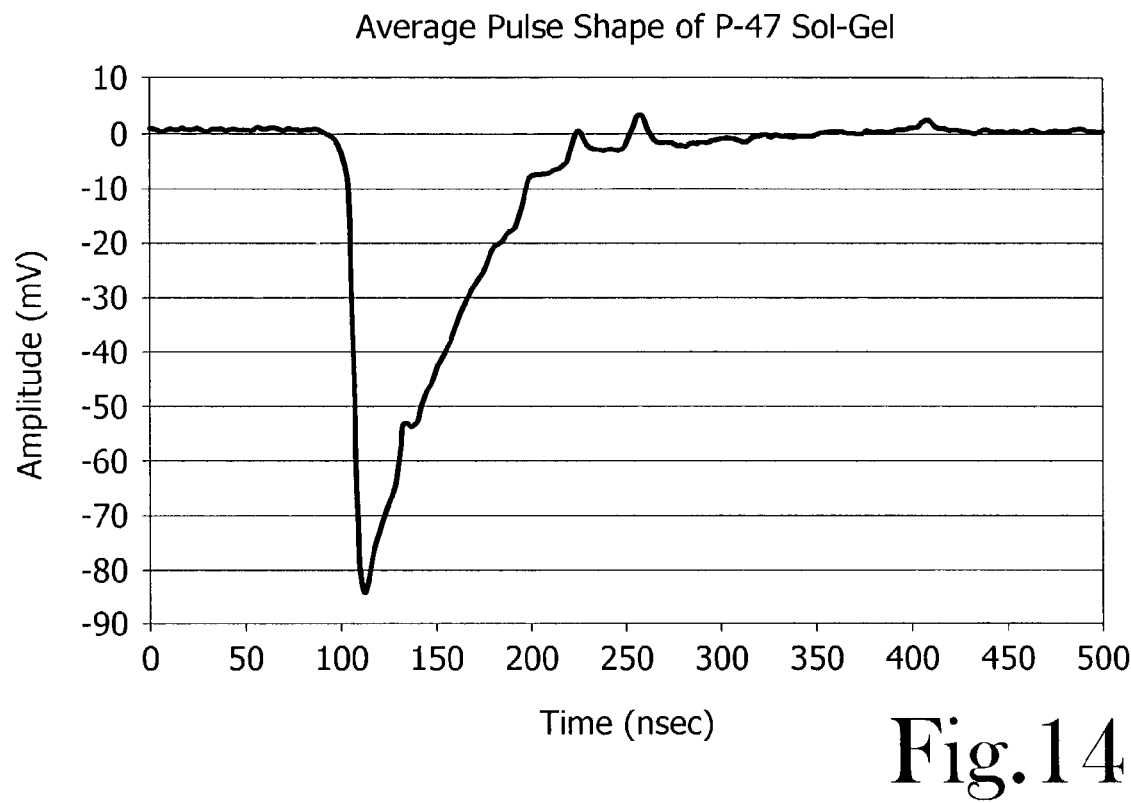
FIG. 14 illustrates the pulse shape for Y$_2$SiO$_5$:Ce (P-47) sol-gel glass.
Figure 15:
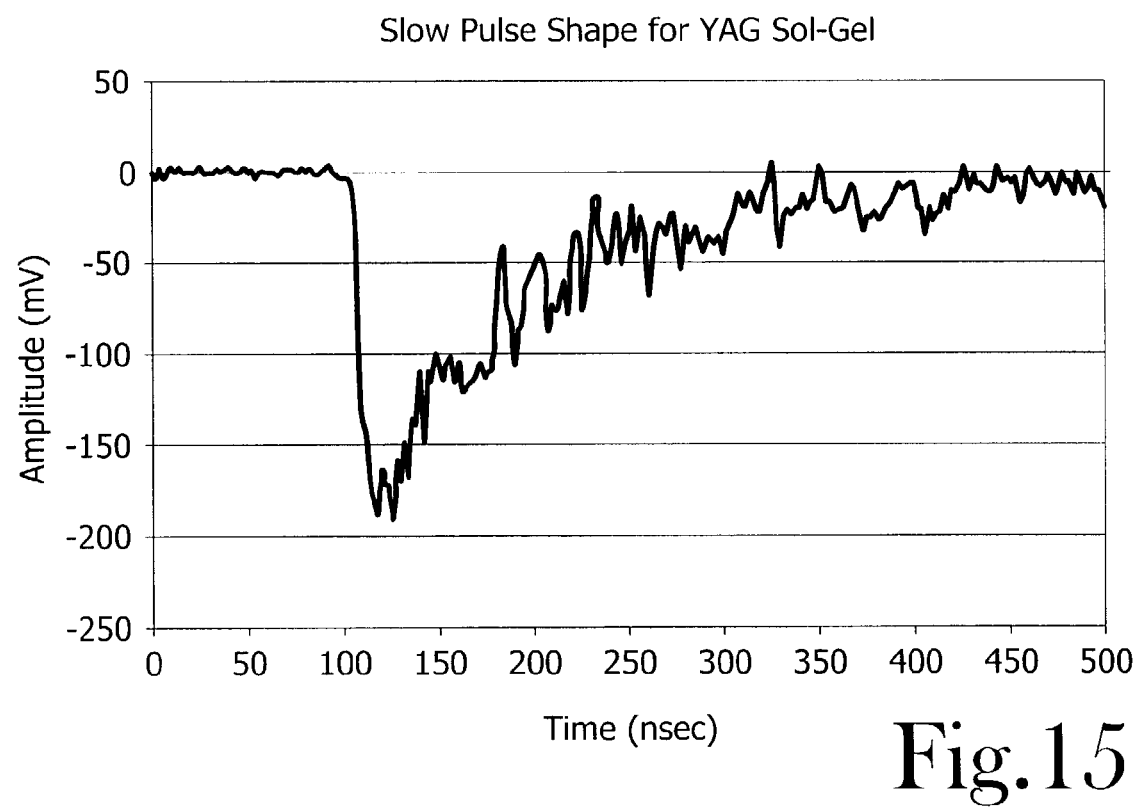
FIG. 15 illustrates the pulse shape for Y$_3$Al$_5$O$_{12}$:Ce (YAG) sol-gel glass.
Figure 16:
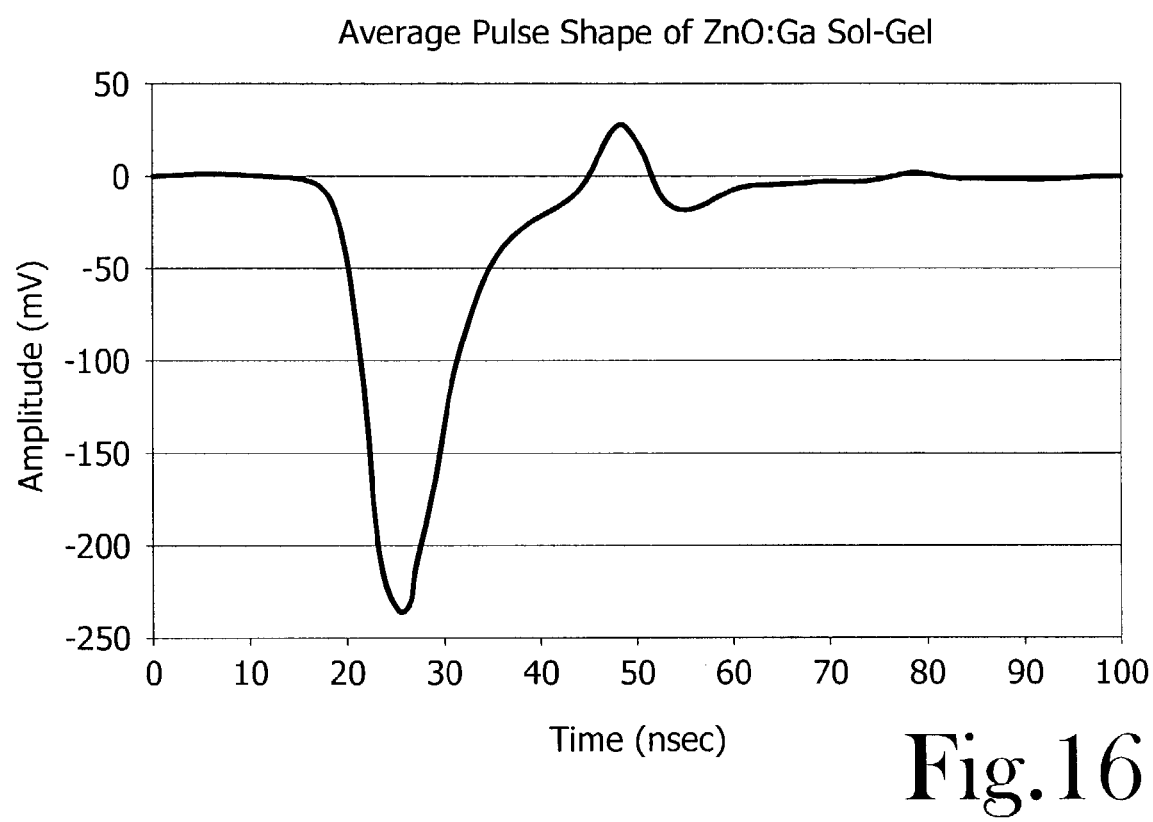
FIG. 16 illustrates the pulse shape for ZnO:Ga sol-gel glass.

FIGS. 8-16 illustrate a further reduction to practice of the present invention. Each figure illustrates the response from lithiated glass absorbing a neutron containing a selected scintillating material. Specifically, FIG. 8 illustrates the pulse shape for BC-400 sol-gel glass; FIG. 9 illustrates the pulse shape for CaS:Ce sol-gel glass; FIG. 10 illustrates the pulse shape for CaSiO3:Mn,Pb sol-gel glass; FIG. 11 illustrates the pulse shape for $La_2O_2S$:Eu sol-gel glass; FIG. 12 illustrates the pulse shape for $Lu_2SiO_5$:Ce (furnished by CTMI, Knoxville, Tenn.) sol-gel glass; FIG. 13 illustrates the pulse shape for polystyrene-POPOP-PPO (furnished by Fermi National Laboratory) sol-gel glass; FIG. 14 illustrates the pulse shape for $Y_2SiO_5$:Ce (P-47) sol-gel glass; FIG. 15 illustrates the pulse shape for $Y_3Al_5O_{12}$:Ce (YAG) sol-gel glass; and FIG. 16 illustrates the pulse shape for ZnO:Ga sol-gel glass. Except as noted above, the scintillating powders are commercially available. Other inorganic compounds from the same commercial sources are available having fast—less than 100 nanosecond fwhm—scintillation pulse output and differing wavelength emission allowing selection to be made to the sensitivity of the selected detector.

From the foregoing description, it will be recognized by those skilled in the art that a neutron detector composed of a matrix of scintillating particles imbedded in a lithiated glass has been disclosed. The neutron detector is provided for detecting neutrons by absorbing the neutrons in a lithium-6 isotope enriched from its natural isotopic ratio to approximately ninety-five percent (95%). The range of scintillating particles amenable to detection using the present invention is limited only by compatibility with current sol-gel methodology. Compatibility with high temperature fusion into the lithiated glass is needed for some scintillants. The present invention provides a means for manufacturing a neutron absorber/scintillating particle matrix utilizing scintillating particles having emission properties superior to ZnS(Ag). The scintillating pulse width output are less than 100 nanoseconds. Coupling of the lithium-6 to the scintillating particulates is accomplished as a homogeneous distribution of the lithium-6 within a glass produced using sol-gel chemistry and into which scintillating particulates are embedded. The lithiated glass of the present invention is useful for generating a signal in the presence of gamma radiation. The material of the present invention is also useful in manufacturing a neutron detector so that a large area is observable for detecting neutrons at a relatively high resolution.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. A neutron detecting material comprising:
a matrix material fabricated from a sol-gel precursor to glass having a volumetrically high loading of a neutron absorbing material, said neutron absorbing material yielding at least one of an electron, a proton, a triton, an alpha particle and a fission fragment when said neutron absorbing material absorbs a neutron; and
a scintillating material in particulate form and embedded in said matrix material to form a heterogeneous composition, said scintillating material being provided to scintillate when traversed by said at least one of an electron, a proton, a triton, an alpha particle and a fission fragment, said scintillating material being configured such that said matrix material surrounding particulates of said scintillating material is dimensioned such that charged particles emitted from said matrix material enter said scintillating material.

2. The neutron detecting material of claim 1 wherein said neutron absorbing material includes at least one element selected from the group consisting of Li-6, B-10, Gd, U-233, U-234, U-235, U-236, U-238, Np-237, Pu-239, Pu-240, Th-232 and Am-241.

3. The neutron detecting material of claim 1 wherein said neutron absorbing material is selected from the group consisting of at least silver, rhodium, gold, indium, and dysprosium.

4. The neutron detecting material of claim 1 wherein said neutron absorbing material is in particulate form, individual particles of said neutron absorbing material defining a size within the range of from approximately five microns to approximately twenty-five microns.

5. The neutron detecting material of claim 1 wherein said scintillating material is selected from the group consisting of at least cerium-activated calcium sulfide, europium-activated calcium sulfide, bismuth germanate, cerium-activated yttrium oxide, cerium-activated yttrium aluminum perovskite, cerium-activated yttrium aluminum garnet, cerium-activated lutetium oxyorthosilicate, cerium-activated yttrium silicate, europium-activated calcium fluoride, gallium-activated zinc oxide, thallium-activated cesium iodide, europium-activated lanthanum oxysulfide, manganese-lead-activated calcium silicate, europium-activated gadolinium oxysulfide, europium-activated indium borate, polystyrene doped with PPO (2,5-diphenyloxazole) as a primary flour and POPOP (1,4-bis(5-phenyloxazol-2-l) benzene) as a secondary flour.

6. The neutron detecting material of claim 5 wherein said scintillation material is in particulate form, individual particles of said neutron absorbing material defining a size within the range of from approximately five microns to approximately twenty-five microns, whereby charged particles originating within said matrix material are transmitted into and captured within said scintillation material particles.

7. The neutron detecting material of claim 1 defining a film disposed on a surface viewable by an optical emission detecting element to image neutrons.

8. The neutron detecting material of claim 1 being disposable on an optically clear disk placed in optical communication with a detector.

9. The neutron detecting material of claim 1 in communication with at least one detector element sensitive to scintillation light, whereby said detector element produces an electrical signal upon detection of scintillation light resulting from neutron absorption by said neutron absorbing material.

10. The neutron detecting material of claim 9 wherein said detector element is selected from the group consisting of a photomultiplier, a silicon photodiode, a charge coupled device, an amorphous silicon screen, a microchannel plate, a channeltron and an avalanche photodiode.

11. The neutron detecting material of claim 9 wherein a plurality of said detector elements is provided for rapidly accumulating data from a chamber utilized for observing temporal dynamics between a pulsed deuterium-tritium source of neutrons and a response recorded from said plurality of detector elements.

12. The neutron detecting material of claim 9 wherein said at least one detector element includes first and second planar arrays of optical fibers, said first array and said second array being disposed orthogonally with respect to each other, said first and second arrays being spaced apart a distance such that optical pulses within said neutron detecting material couple into at least one fiber in each of said first and second arrays, whereby a position of a neutron absorption in an x-y plane in yielded.

13. The neutron detecting material of claim 12 wherein each of said first and second arrays is defined by a plurality of spaced apart fibers, wherein space between said fibers is filled with a lithiated glass containing scintillation material.

* * * * *